United States Patent
Butler et al.

[11] Patent Number: 5,667,257
[45] Date of Patent: Sep. 16, 1997

[54] CONNECTOR ASSEMBLY

[75] Inventors: Brian H. Butler, Washington; Leslie E. Fehr, Bradford; William J. McCasky, Sparland, all of Ill.

[73] Assignee: Caterpillar Inc., Peoria, Ill.

[21] Appl. No.: 204,919

[22] Filed: Mar. 1, 1994

[51] Int. Cl.$^6$ ........................................ F16L 5/08
[52] U.S. Cl. ..................... 285/212; 285/354; 285/921
[58] Field of Search ................................ 285/212, 921, 285/161, 206, 354; 165/104.32

[56] References Cited

U.S. PATENT DOCUMENTS

| | | | |
|---|---|---|---|
| 978,504 | 12/1910 | Stewart | 285/212 |
| 2,532,669 | 12/1950 | Jones | 285/354 X |
| 4,018,459 | 4/1977 | Mominee et al. | 285/921 |
| 4,234,218 | 11/1980 | Rogers | 285/161 |
| 4,427,879 | 1/1984 | Becher et al. | 285/921 |
| 4,462,620 | 7/1984 | Bambenek et al. | 285/921 |
| 5,068,496 | 11/1991 | Favalora | 285/206 |
| 5,096,232 | 3/1992 | Fond et al. | 285/21 |

FOREIGN PATENT DOCUMENTS

| | | | |
|---|---|---|---|
| 100185 | 1/1937 | Australia | 285/206 |
| 2273324 | 6/1994 | United Kingdom | 285/206 |

*Primary Examiner*—Terry Lee Melius
*Assistant Examiner*—Heather Shackelford
*Attorney, Agent, or Firm*—Diana L. Charlton; Larry G. Cain; Joseph W. Keen

[57] ABSTRACT

Past connector assemblies have failed to provide adequate amounts of the air/cooling liquid mixture from the heat exchanger to the surge tank for proper air venting. The present invention overcomes this and other problems by providing a connector assembly 48 which is easily installed within a tank portion 14 of the heat exchanger 12. The connector assembly 48 includes a tubular member 50 which has a cylindrical portion 54 and a bifurcated end portion 56. The bifurcated end portion 56 has a rectangular outer shape 66 which is designed so that it can be squeezed into a rectangular shaped opening 44 in the tank portion 14. A nut 92 which has an inner threaded portion 104 is threaded onto an outer threaded portion 64 of the cylindrical portion 54 until a pair of tabs 76,78 on the bifurcated end portion 56 are securely seated against an inner surface 16 of the tank portion 14. A washer 110 is seated against an annular beaded seat 36 to form a first seal. An o-ring 112 is seated within an inner annular groove 108 of the nut 92 to form a second seal. The tubular member 50 has an internal bore 52 which has a diameter greater than 0.256 inches/7 mm for communicating the proper amount of air/cooling liquid mixture to the surge tank (not shown) so that adequate air venting occurs.

7 Claims, 2 Drawing Sheets

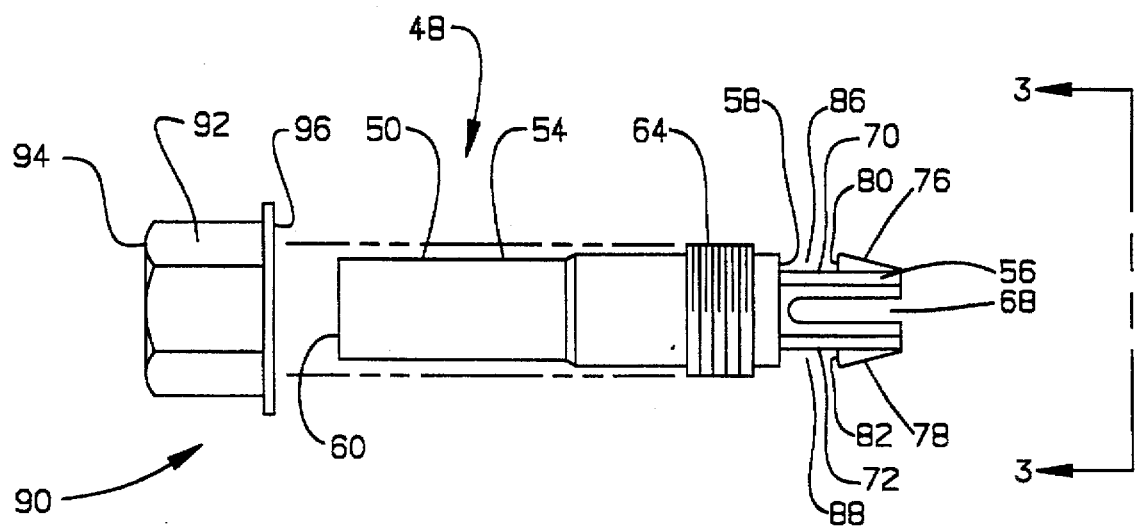
Fig_2_
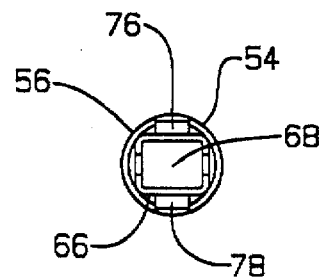
Fig_3_

CONNECTOR ASSEMBLY

TECHNICAL FIELD

This invention relates generally to a connector assembly for use in a heat exchanger and more particularly to the use of the connector assembly for communicating air for venting from the heat exchanger during operation with an internal combustion engine.

BACKGROUND ART

During normal engine operation, the cooling system continually circulates liquid throughout the engine for cooling purposes. During circulation, air may be introduced into the cooling system which lowers cooling effectiveness and may cause subsequent damage to cooling system pumps or internal components. For this reason, most heat exchangers for use with internal combustion engines include a method for venting in order to allow the air that has entered the cooling system to be evacuated. A percentage of the air/ cooling liquid mixture contained in the heat exchanger is communicated to a surge tank. The cooling liquid is circulated through the surge tank and into the internal combustion engine while the air is vented through an opening in the surge tank. Various venting methods have been used to evacuate the air from the cooling system.

Most venting methods involve utilization of a connector assembly which is securely fastened to the heat exchanger to communicate between the heat exchanger and the separate surge tank. Generally, the connector assembly includes a member which is snapped into an opening within a tank portion of the heat exchanger. The member has a pair of tabs which serve to hold the member in place within the opening and an inner threaded portion. A tapered body including an integral nut has an outer threaded portion which is threaded into the inner threaded portion until the connector assembly is securely fastened on the heat exchanger. The tapered body has a bore therein allowing a specific amount of air and cooling liquid to communicate from the heat exchanger to the surge tank. The air communicated from the heat exchanger is released from the surge tank through an opening therein and the cooling liquid is recirculated through the cooling system. The design of the connector assembly is complicated, and unfortunately, the bore within the tapered body is located on the smallest portion of the tapered body so that the bore has a diameter less than 4 mm. The small bore size does not allow an adequate amount of air to leave the cooling system of most engines. The inability to remove the air from the cooling system leads to the ultimate destruction of the cooling system pump or other internal components. Therefore, the connector assembly must be replaced to allow proper venting.

The present invention is directed to overcoming the problems as set forth above.

DISCLOSURE OF THE INVENTION

In one aspect of the present invention, a connector assembly is used with a heat exchanger having a hollow tank portion. The tank portion has an inner surface, an outer surface, and an opening therein for communication with ambient air. The connector assembly includes a tubular member with a substantially cylindrical portion. The cylindrical portion has a first end and a second end. A bifurcated end portion extends from the first end and has a pair of outwardly facing parallel faces. The pair of faces each include a tab integrally formed thereon. Each tab has an angularly disposed surface which extends divergently from the face toward the first end and terminates at a shoulder perpendicular to the face and spaced a predetermined distance from the first end of the cylindrical portion. A means is provided for securing the tubular member within the opening so that the shoulder of the tab is fitted against the inner surface of the tank portion when installed.

In another aspect of the present invention, a connector assembly is adapted for use with a heat exchanger of an internal combustion engine. A tubular member includes a substantially cylindrical portion which has a first end and a second end. An outer threaded portion is located in close proximity to the first end of the cylindrical portion. A bifurcated end portion extends from the first end and has a pair of outwardly facing parallel faces. The pair of faces each include a tab integrally formed thereon. Each tab has an angularly disposed surface which extends divergently from the face toward the first end and terminates at a shoulder perpendicular to the face and spaced a predetermined distance from the first end of the cylindrical portion. A nut has an outer surface, an inner surface, an inner portion, and an inner threaded portion threaded onto the outer threaded portion.

The present invention, through the use of a connector assembly which is simple and easily assembled within a heat exchanger, provides a means for allowing the venting of air from the heat exchanger for greater cooling system efficiency and longer component life.

BRIEF DESCRIPTION OF THE DRAWINGS

FIG. 2 is a diagrammatic exploded view of the present invention; and

FIG. 3 is a partial section view of the line taken along 3—3 shown in FIG. 2.

BEST MODE FOR CARRYING OUT THE INVENTION

Figure 1:
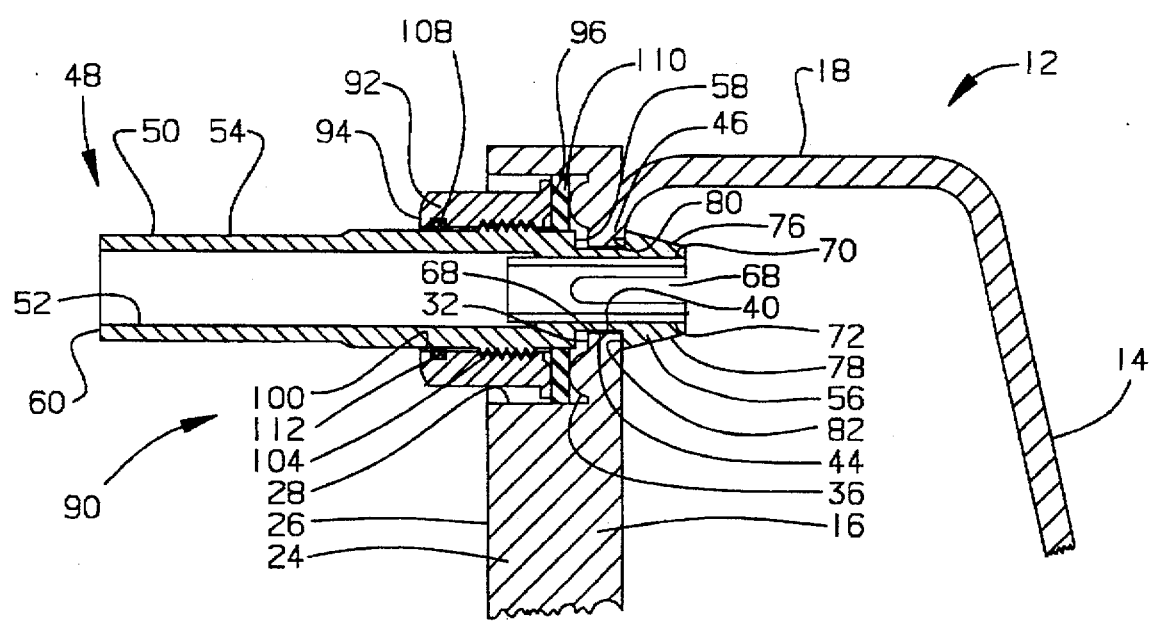
FIG. 1 is a partial section view of an heat exchanger embodying the present invention.

A heat exchanger 12 is partially illustrated in FIG. 1 and contains cooling liquid (not shown). The heat exchanger 12 has a hollow tank portion 14 which is located in an area of high cooling liquid pressure. However, it should be understood that the tank portion 14 may be located in an area of low cooling liquid pressure dependent upon the type of heat exchanger used. The tank portion 14 is formed in a well known fashion from a material. The tank portion 14 has an inner surface 16, an outer surface 18, and a flange 24 which extends from the inner surface 16 of the tank portion 14 a predetermined distance and terminates at a front face 26. A first bore 28 extends from the front face 26 and into the flange 24 a predetermined distance terminating at an annular shoulder 32. An annular beaded seat 36 extends from the annular shoulder 32 and into the first bore 28. A second rectangular bore 40 extends from the annular shoulder 32 and through the inner surface 16 of the tank portion to define an opening 44 therein. The opening 44 permits communication between the cooling liquid and ambient air. The annular shoulder 32, the second bore 40, and the inner surface 16 form a rectangular shaped lip 46.

A connector assembly 48 is shown in FIGS. 1–3 and is disposed within the opening 44 for communicating air/ cooling liquid mixture from the heat exchanger 12 to a remote surge tank (not shown). The connector assembly includes a tubular member 50 which has a internal bore 52 with diameter greater than 0.256 inches/7 mm. The tubular member 50 has a substantially cylindrical portion 54 and a bifurcated end portion 56. The cylindrical portion 54 has a first end 58 and a second end 60. An outer threaded portion 64 is disposed on the cylindrical portion 54 in close proximity to the first end 58. The bifurcated end portion 56 extends outwardly from the first end 58 and has a rectangular outer shape 66 that defines an inner rectangular opening 68. The bifurcated end portion 56 has pair of outwardly facing parallel faces 70,72. The pair of faces 70,72 each have a tab 76,78 which extend divergently from the face 70,72, respectively, toward the first end 58. The tabs 76,78 terminate at a shoulder 80,82 perpendicular to the face 70,72, respectively, and are spaced a predetermined distance from the first end 58 to define a pair of slots 86,88. The shoulders 80,82 of the tabs 76,78 are located adjacent the inner surface 16 of the tank portion 14 so that the rectangular lip 46 is seated within the slots 86,88.

A means for securing 90 the tubular member 50 within the opening 44 so that the shoulders 80,82 of the tabs 76,78, respectively, are fitted against the inner surface 16 of the tank portion 14 is shown in FIGS. 1–2. The securing means 90 includes a nut 92 which has an outer surface 94, an inner surface 96, an inner bore 100, and an inner threaded portion 104 formed within the inner bore 100. An inner annular groove 108 is formed within the inner bore 100 near the outer surface 94. A sealing means 110, such as a rubber washer, is fitted between the inner surface 96 of the nut 92 and the outer surface 18 of the tank portion 14. The inner threaded portion 104 is threaded onto the outer threaded portion 64 until the washer 110 is seated against the beaded seat 36 to form a first seal. An o-ring 112 is seated with the inner annular groove 108 to form a second seal.

INDUSTRIAL APPLICABILITY

In use, air enters the heat exchanger 12 during normal operation. An air/cooling liquid mixture can be communicated to the surge tank (not shown) through the connector assembly 48 so that air can be evacuated from the cooling system through a vent (not shown) in the surge tank (not shown).

The air/cooling liquid mixture is contained within the heat exchanger 12 and is communicated from the tank portion 14 to the surge tank (not shown) through the internal bore 52 of the tubular member 50. The amount of air/cooling liquid mixture which is communicated through the tubular member 50 is directly proportional to the diameter of the internal bore 52. Therefore, the greater the diameter of the internal bore 52, the greater the air/cooling liquid mixture which can be communicated to the surge tank (not shown). The greater the amount of air/cooling liquid communicated to the surge tank (not shown) increases the amount of air which can be evacuated from the cooling system.

The connector assembly 48 is easily assembled onto the heat exchanger 12 and requires no removal of the heat exchanger 12 from the vehicle. This makes the connector assembly 48 desirable as a replacement part for maintenance or repair work. The rectangular outer shape 66 of the bifurcated end portion 56 is easily fitted into the rectangular bore 40 of the heat exchanger 12 by squeezing the faces 70,72. The bifurcated end portion 56 is pushed through the opening 44 until the rectangular shaped lip 46 of the heat exchanger 12 is seated within the slots 86,88 of the bifurcated end portion 56. Once the faces 70,72 are released, the first end 58 and the tabs 76,78 are designed to hold the connector assembly 48 in place so that it cannot fall from the opening 44. The inner threaded portion 104 of the nut 92 is threaded onto the outer threaded portion 64 until the shoulders 80,82 of the tabs 76,78 are seated against the inner surface 16 of the tank portion 14. Simultaneously, the washer 110 is sealingly seated against the beaded seat 36 to substantially seal the air/cooling liquid mixture as it is communicated from the heat exchanger 12 to the surge tank (not shown). However, some air/cooling liquid mixture may leak past the inner and the outer threaded portions 106,64, respectively. The o-ring 112 is fitted into the inner annular groove 108 to seal any air/cooling liquid leaking past the washer 110 to virtually eliminate any leakage of cooling liquid to the ambient air.

In view of the above, the use of a connector assembly which is simple and easily assembled within a heat exchanger provides a means for allowing the evacuation of air from a heat exchanger for greater cooling system efficiency and prolonged component life.

We claim:
1. In combination:
   a hollow tank portion having an inner surface, an outer surface, and an opening therein, said tank portion's outer surface includes an annular beaded seat disposed about said opening;
   a fluid tight tubular member including a substantially cylindrical portion having a first end and a second end, an outer threaded portion in close proximity to the first end, and a bifurcated end portion extending from the first end and having a pair of outwardly facing parallel faces, the pair of faces each including a tab integrally formed thereon with each tab having an angularly disposed surface extending divergently from the face toward the first end and terminating at a shoulder perpendicular to the face and spaced a predetermined distance from the first end of the cylindrical portion;
   means for securing the tubular member within the opening so that the shoulder of the tab is fitted against the inner surface of the tank portion when installed, said securing means including a nut having an outer surface, an inner surface, an inner bore, and an inner threaded portion threadably engaged with an outer threaded portion of said tubular member so that the inner surface is adjacent the outer surface of the tank portion and said second end extends beyond said nut's outer surface when installed; and
   sealing means disposed between the inner surface of the nut and the outer surface of the tank portion for sealing therebetween, said beaded seat protruding toward and being engageable with said sealing means.
2. The combination of claim 1, wherein the tubular member has an internal diameter greater than 4 mm.
3. The combination of claim 1, wherein the nut has an inner annular groove therein disposed within the inner portion of the nut and an o-ring is seated within the inner annular groove.
4. The combination of claim 1, wherein the tubular member has an internal diameter greater than 4 mm.
5. The combination of claim 1, wherein the bifurcated end portion defines a space between the faces, the space having a radius located at the juncture between the first end of the cylindrical portion and the bifurcated end portion.
6. The combination of claim 1, wherein the tank portion has high pressure therein.
7. The combination of claim 1, wherein the tank portion has low pressure therein.

\* \* \* \* \*